United States Patent

Thomas et al.

[19]

[11] Patent Number: 5,921,271

[45] Date of Patent: Jul. 13, 1999

[54] SAFETY SHUT-OFF VALVE FOR HIGH PRESSURE BOTTLES

[76] Inventors: Clinton L. Thomas, 1201 N. Custer, Miles City, Mont. 59301; Jason R. Coldwell, HC 46, Kinsey, Mont. 59338

[21] Appl. No.: 08/847,825

[22] Filed: Apr. 28, 1997

Related U.S. Application Data

[63] Continuation of application No. 08/417,236, Apr. 5, 1995., abandoned

[51] Int. Cl.[6] .................................................. F16K 15/04
[52] U.S. Cl. .................. 137/269.5; 137/517; 137/537
[58] Field of Search ................... 137/269.5, 270, 137/271, 460, 498, 517, 537

[56] References Cited

U.S. PATENT DOCUMENTS

| | | | |
|---|---|---|---|
| 3,326,233 | 6/1967 | Perruzzi | 137/460 |
| 3,331,389 | 7/1967 | Kirk | 137/537 X |
| 3,441,052 | 4/1969 | Schilling | 137/517 |
| 3,661,167 | 5/1972 | Hussey | 137/269.5 |
| 3,661,175 | 5/1972 | Tillman | 137/537 X |
| 4,004,533 | 1/1977 | Woolston | 137/517 |
| 4,089,343 | 5/1978 | Ishida | 137/484.8 |
| 4,349,043 | 9/1982 | Christensen | 137/505.42 |
| 4,611,628 | 9/1986 | Pasternack | 137/509 |
| 4,744,387 | 5/1988 | Otteman | 137/505.41 |
| 4,846,218 | 7/1989 | Upchurch | 137/269.5 |
| 5,022,435 | 6/1991 | Jaw-Shiunn | 137/613 |
| 5,123,442 | 6/1992 | Geuy et al. | 137/495 |

FOREIGN PATENT DOCUMENTS

| | | |
|---|---|---|
| 1087683 | 2/1955 | France . |
| 1446854 | 12/1972 | United Kingdom . |

*Primary Examiner*—John Rivell
*Attorney, Agent, or Firm*—Salzman & Levy

[57] ABSTRACT

A safety shut-off having a spring loaded ball which moves into engagement with a valve seat in response to excess gas flow. Engagement of the ball with the valve seat shuts off gas flow. Excessive gas flow is generally encountered when a catastrophic breakage downstream of the valve causes the downstream pressure to drop precipitously.

2 Claims, 5 Drawing Sheets

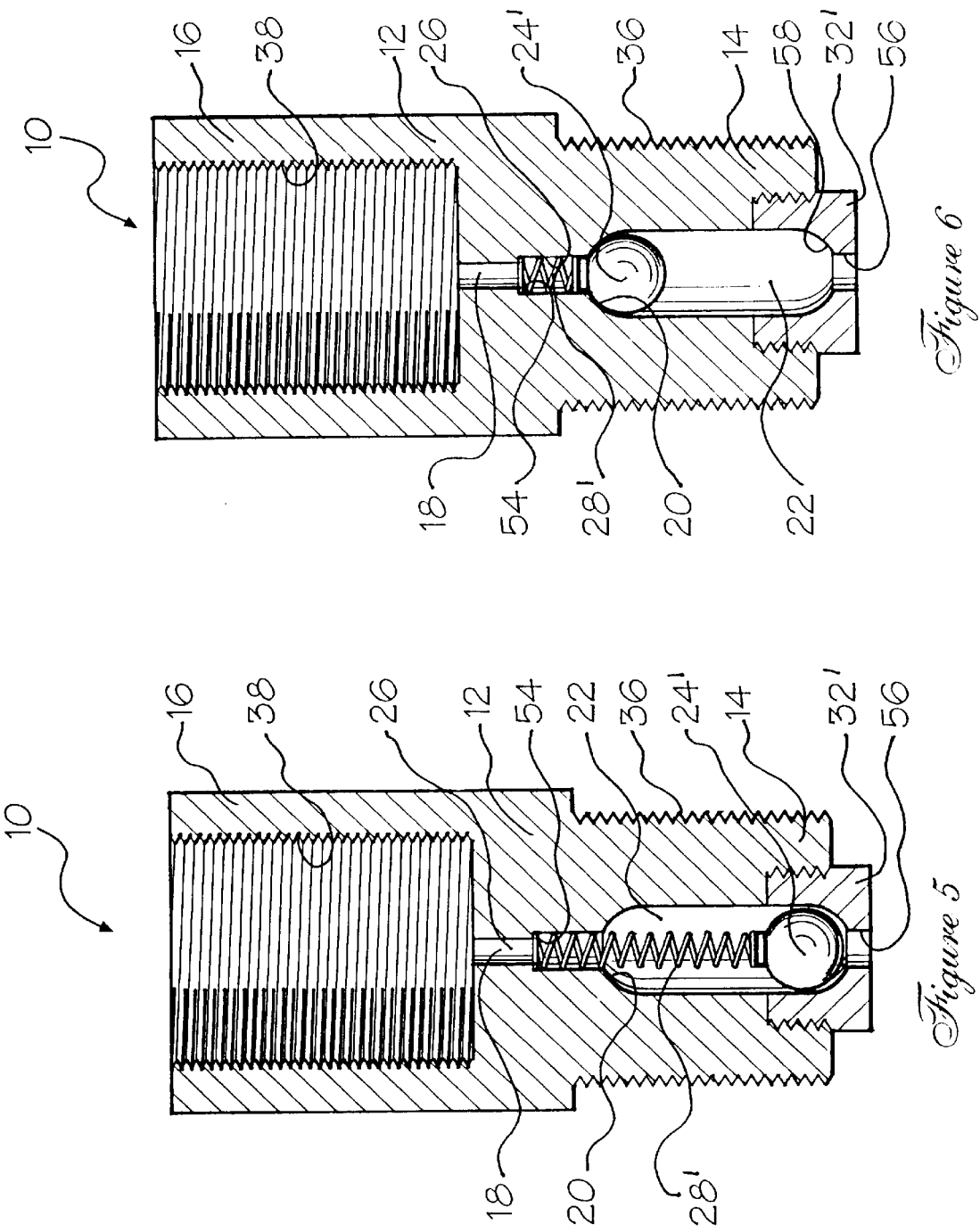

SAFETY SHUT-OFF VALVE FOR HIGH PRESSURE BOTTLES

This application is a continuation of application Ser. No. 08/417,236 filed on Apr. 5, 1995 now abandoned.

BACKGROUND OF THE INVENTION

1. Field of the Invention

The present invention relates to safety valve for preventing the uncontrolled release of high pressure fluids in the event of catastrophic failure in the fluid conducting equipment downstream of the safety valve.

2. Description of the Prior Art

Many applications require the confinement of hazardous fluids in high pressure bottles. For example, in welding, oxygen and acetylene are confined in bottles under high pressure. In such applications, a breakage in a valve or gas line downstream of the bottle can lead to an uncontrollable release of high pressure gas. High pressure gas issuing from the attachments to the bottle can propel the bottle at high velocity causing injury to persons in the vicinity of the bottle. In addition, uncontrolled discharges of gases such as oxygen and acetylene can lead to an explosion hazard.

To overcome the hazards of uncontrolled gas discharge several safety valves have been proposed in the prior art. However, none of the prior art valves providing for automatic shut-off of the gas flow in the event of catastrophic failure downstream of the pressure source, have the simplicity of design of the present invention.

U.S. Pat. No. 4,089,343, issued to Ishida, shows a safety valve wherein a sealing member is moved to its sealing position in response to high pressure downstream of the valve. This condition can occur in response to a line blockage downstream of the valve. Clearly this valve design would be ineffective in stopping flow in case of loss of gas containment downstream of the valve.

U.S. Pat. No. 4,349,043, issued to Christensen, shows a safety valve wherein a sealing member is moved to its sealing position in response to high pressure upstream of the valve. In the Christensen design, catastrophic breakage downstream of the valve would cause even greater opening of the valve. Thus the Christensen device acts in a way totally opposite to the action of the present invention.

U.S. Pat. No. 4,611,628, issued to Pasternack, shows a pressure attenuator that retards the impact of a pressure wave when a manual shut-off valve to a high pressure bottle is first opened. The Pasternack device is incapable of completely shutting off escape of gas from the bottle in the event of a breakage in the line downstream of the device.

U.S. Pat. No. 4,744,387, issued to Otteman, shows a pressure regulator valve wherein a sealing member is moved to its sealing position in response to high pressure upstream of the valve. In the Otteman design, catastrophic breakage downstream of the valve would cause even greater opening of the valve. Thus the Otteman device acts in a way totally opposite to the action of the present invention.

U.S. Pat. No. 5,022,435, issued to Jaw-Shiunn, shows combination pressure regulator and safety shut-off valve. Jaw-Shiunn show a spring loaded ball or the in-line configuration of the present invention. Further, the Jaw-Shiunn device requires a plunger to reset the ball unlike the present invention.

U.S. Pat. No. 5,123,442, issued to Geuy et al., shows a safety shut-off valve having a floating valve seat which moves into engagement with a piston, in response to higher than normal pressure in the gas bottle, thus shutting off gas flow. The Geuy et al. device does not have the spring loaded ball or the in-line configuration of the present invention.

French Patent Document Number 1.087.683, by Ateliers la Locomecanique, shows a safety valve where a high pressure downstream of the valve causes the gas flow to be shut off. In the device of French Document '683, catastrophic breakage downstream of the valve would cause even greater opening of the valve. Thus the device of French Document '683 acts in a way totally opposite to the action of the present invention.

United Kingdom Patent Document Number 1 446 854, by King, shows a safety shut-off valve which shuts off gas flow when a gas line is disconnected manually from an appliance. The King device will not shut off gas flow in the event of breakage in the line or in the appliance, unlike the present invention which responds to any type of catastrophic failure.

None of the above inventions and patents, taken either singly or in combination, is seen to describe the instant invention as claimed.

SUMMARY OF THE INVENTION

The present invention is directed to a safety shut-off having a spring loaded ball which moves into engagement with a valve seat in response to excess gas flow. Engagement of the ball with the valve seat shuts off gas flow. Excessive gas flow is generally encountered when a catastrophic breakage downstream of the valve causes the downstream pressure to drop precipitously. The abnormal increase in pressure drop across the valve leads to an abnormal increase in gas flow. Under such circumstances the gas dynamic forces on the ball move it into engagement with the valve seat.

Accordingly, it is a principal object of the invention to provide a safety shut-off valve which shuts of gas flow when there is a loss of gas containment downstream of the valve.

It is another object of the invention to provide a safety shut-off valve which shuts of gas flow independently of the nature of the apparatus downstream of the valve.

It is a further object of the invention to provide a safety shut-off valve which can easily be retrofitted to existing gas bottles.

Still another object of the invention is to provide a safety shut-off valve which is simple in construction and easy to install.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 5 is a cross sectional view of a fourth embodiment of the safety shut-off valve of the present invention with the ball in the normal position.

FIG. 6 is a cross sectional view of a fourth embodiment of the safety shut-off valve of the present invention with the ball in the shut-off position.

Similar reference characters denote corresponding features consistently throughout the attached drawings.

DETAILED DESCRIPTION OF THE PREFERRED EMBODIMENTS

The present invention relates to a safety shut-off having a spring loaded ball which moves into engagement with a valve seat in response to excess gas flow. Engagement of the ball with the valve seat shuts off gas flow. Excessive gas flow is generally encountered when a catastrophic breakage downstream of the valve causes the downstream pressure to drop precipitously. The abnormal increase in pressure drop across the valve leads to an abnormal increase in gas flow. Under such circumstances the gas dynamic forces on the ball move it into engagement with the valve seat, thereby shutting off gas flow.

Various embodiments of the present invention are discussed separately below.

EMBODIMENT 1

Figure 1:
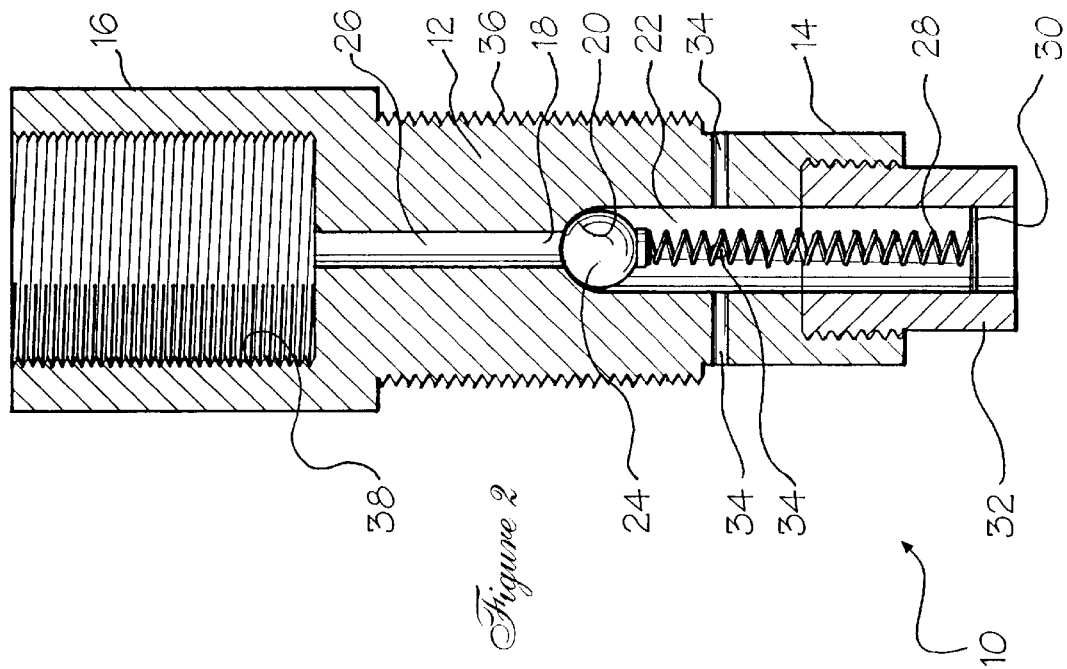
FIG. 1 is a cross sectional view of a first embodiment of the safety shut-off valve of the present invention with the ball in the normal position.
Figure 2:
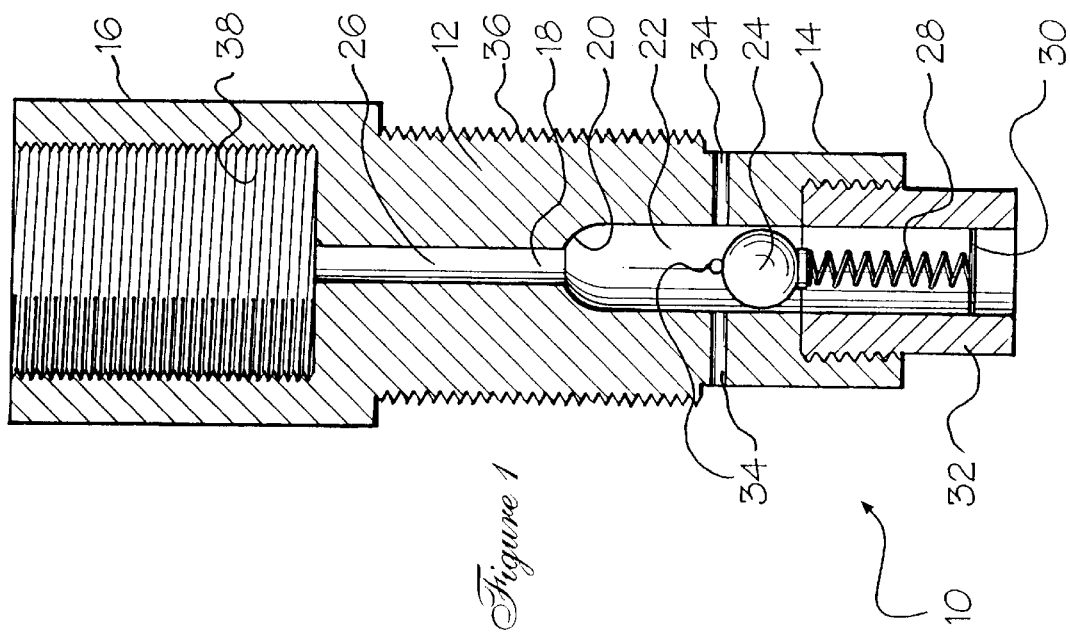
FIG. 2 is a cross sectional view of a first embodiment of the safety shut-off valve of the present invention with the ball in the shut-off position.

Referring to FIGS. 1 and 2, the safety shut-off valve 10 includes an elongated valve body 12 having first and second ends 14 and 16 respectively. The valve body has a passage 18 extending therethrough. A valve seat 20 is provided in passage 18 at a first end of a large diameter portion 22 of the passage 18. A ball 24 having substantially the same diameter of portion 22 of the passage 18 is housed within the portion 22. The valve seat 20 is located between the large diameter portion 22 and a smaller diameter portion 26 of the passage 18.

The ball 24 is movable within the large diameter portion 22 of the passage 18. Under normal circumstances ball 24 is in a first position away from valve seat 20, as shown in FIG. 1. Under normal conditions, a spring 28 which is under tension, maintains ball 24 in the first position shown in FIG. 1. The spring 28 is attached to the ball 24 at one end and to a retaining pin 30 at the other.

Threaded insert 32 can be screwed into and out of the first end 14 of the valve body 12 to allow assembly or disassembly of valve 10. With the insert 32 removed, the pin 30 can be removed using a punch to completely disassemble valve 10.

With ball 24 in the normal position, the four portholes 34 in the valve body 12, are positioned intermediate the ball 24 and valve seat 20 and provide for the normal flow of fluid through the valve 10. The four portholes 34 extend radially from the large diameter portion 22 of passage 18, a first pair of portholes extending along a first axis and a second pair extending along a second axis perpendicular to the first axis.

In use, the valve 10 is threadably connected, for example, to the outlet of a high pressure gas bottle (not shown) using the male threads 36. A pressure regulator and further conduits (not shown) can in accordance with conventional practice be attached to the valve 10 using female threads 38. With valve 10 installed in the high pressure fluid line, fluid under normal conditions would flow for the most part through portholes 34. A sufficient gap exists between large-diameter portion 22 of passage.18 and the ball 24, for some fluid to flow therethrough under normal circumstances. If there is a sudden loss of fluid containment downstream of valve 10, for example due to a hose breakage, the pressure downstream of valve 10 will suddenly drop to near atmospheric. This leads to a sudden increase in the pressure drop across the valve 10 leading to a sudden increase in fluid flow through portholes 34 and through the gap between ball 24 and large diameter passage portion 22.

The increase in flow around ball 24 increases the fluid dynamic drag force on ball 24. With the uncontrolled fluid flow associated with a loss of containment, the drag force on the ball is sufficient to stretch spring 28 until the ball 24 seats in valve seat 20 thereby shutting off further flow of fluid. This activated position of valve 10 is shown in FIG. 2. Once fluid containment is restored, for example by repairing the ruptured hose, ball 24 will return to its normal position allowing normal operation of the high pressure fluid system to resume.

EMBODIMENTS 2 AND 3

Figure 3:
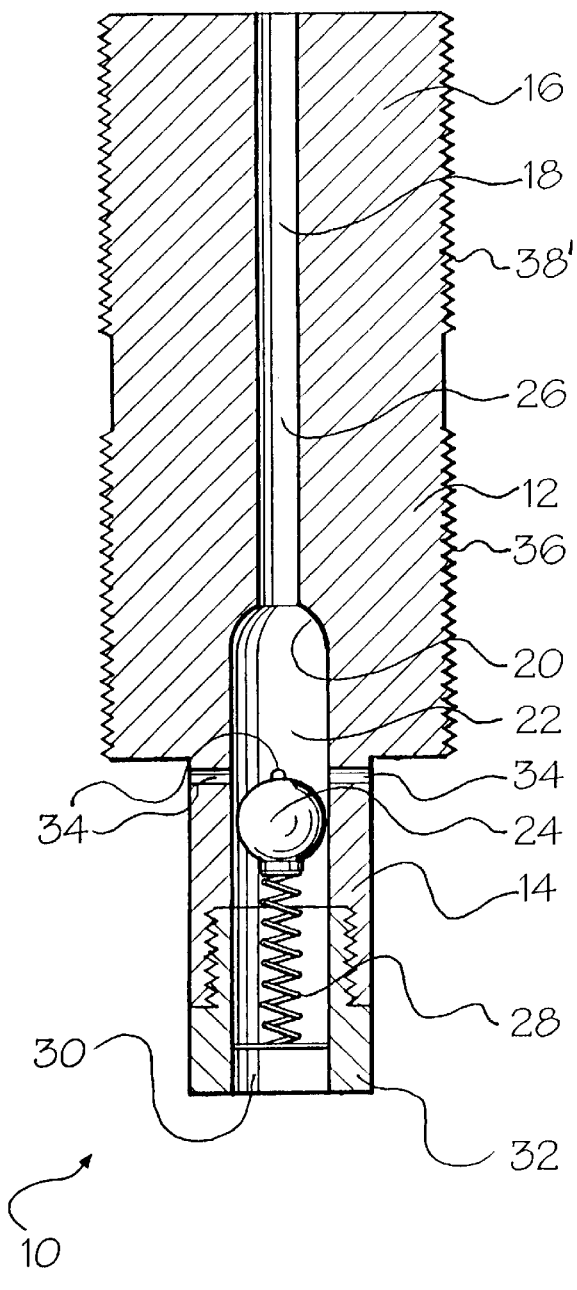
FIG. 3 is a cross sectional view of a second embodiment of the safety shut-off valve of the present invention with the ball in the normal position.
Figure 4:
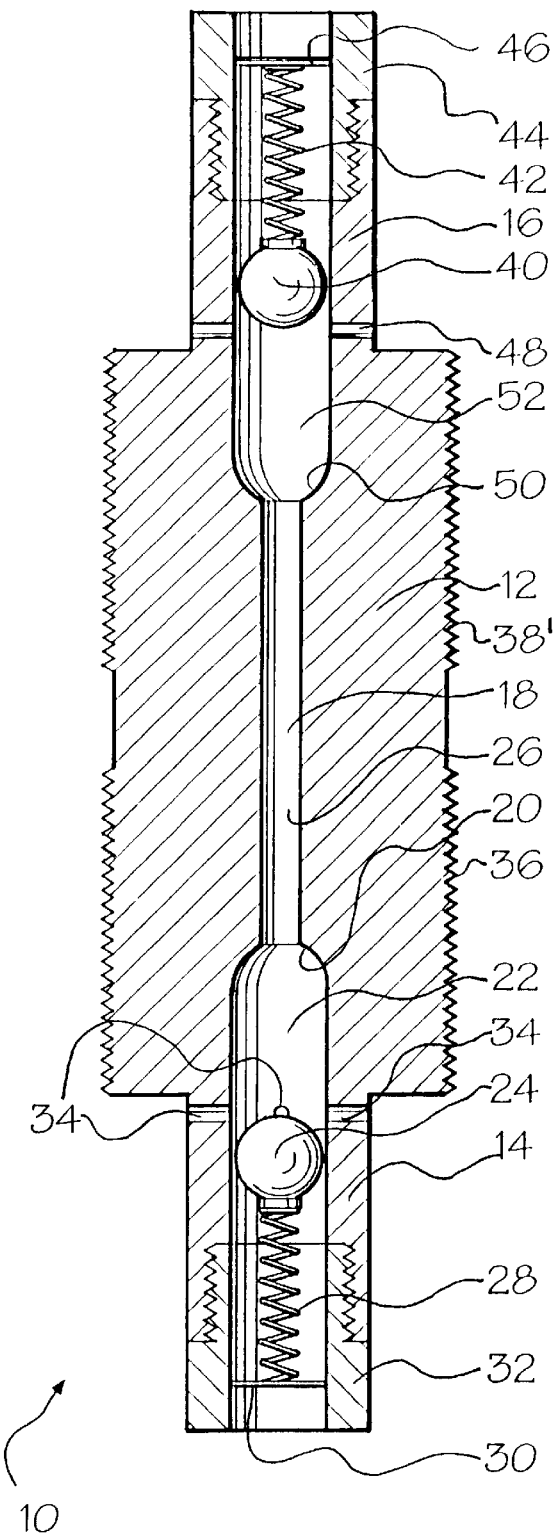
FIG. 4 is a cross sectional view of a third embodiment of the safety shut-off valve of the present invention with the ball in the normal position.

Referring to FIGS. 3 and 4 variations of the first embodiment are seen. The embodiment shown in FIG. 3 is identical to the embodiment shown in FIGS. 1 and 2 except that female threads 38 are replaced by male threads 38'. This variation allows the valve 10 to be used in applications where both the outlet of the high pressure bottle and the downstream valve or conduit have female threads.

Referring to FIG. 4 a variation of the embodiment of FIG. 3 is seen. In this embodiment a second ball 40, second spring 42, second threaded insert 44, second pin 46, second set of portholes 48, and second valve seat 50 are provided at the second end 16 of the valve body 12. The second ball 40, second spring 42, second threaded insert 44, second pin 46, second set of portholes 48, and second valve seat 50 are arranged to be a mirror image of the arrangement at the first end 14 of valve body 12. A second large diameter portion 52 is also provided to house the second ball 40, second spring 42, and the second pin 46. The second large diameter portion 52 has the same diameter as the large diameter portion 22 and is a mirror image thereof. Like portholes 34, portholes 48 extend radially outward from large diameter portion 52.

Having identical ends for the valve 10 allows either one of ends 14 and 16 to act as the fluid inlet to the valve. This arrangement eliminates the possibility of installing the valve 10 with the wrong end upstream. The ball and spring in the end acting as the inlet behave in exactly the same way as was described in reference to the embodiment of FIGS. 1 and 2. The ball and spring in the end acting as the outlet have no effect on flow control. Except as noted above the embodiments of FIGS. 3 and 4 are identical.

EMBODIMENT 4

Referring to FIGS. 5 and 6, the safety shut-off valve 10 includes an elongated valve body 12 having first and second ends 14 and 16 respectively. The valve body has a passage 18 extending therethrough. A valve seat 20 is provided in passage 18 at a first end of a large diameter portion 22 of the passage 18. A ball 24' having substantially the same diameter of portion 22 of the passage 18 is housed within the portion 22. The valve seat 20 is located between the large diameter portion 22 and a smaller diameter portion 26 of the passage 18.

The ball 24' is movable within the large diameter portion 22 of the passage 18. Under normal circumstances ball 24' is in a first position away from valve seat 20, as shown in FIG. 1. Under normal conditions, a spring 28' which is under compression, maintains ball 24' in the first position shown in FIG. 5. The spring 28' extends between the ball 24' at one end and a retaining shoulder 54 at the other. The retaining shoulder 54 is formed by slightly enlarging the small diameter passage portion 26 for a certain length just ahead of valve seat 20. The small diameter passage portion 26 is of substantially uniform diameter, the variation caused by the presence of shoulder 54 being very minor.

Threaded insert 32' can be screwed into and out of the first end 14 of the valve body 12 to allow assembly or disassembly of valve 10. Threaded insert 32' has a small diameter portion 56 which acts to retain ball 24' within large diameter portion or cavity 22. With the insert 32 removed, the ball 24' and spring 28' simply fall free of valve body 12 to completely disassemble valve 10.

Under normal conditions fluid pressure at the upstream end of valve 10 is sufficient to lift ball 24' off the seat 58 thus allowing fluid to flow through the valve 10. With ball 24' in the normal position (shown in FIG. 5) all fluid flow occurs in the gap between ball 24' and the walls of cavity 22.

In use, the valve 10 is threadably connected, for example, to the outlet of a high pressure gas bottle (not shown) using the male threads 36. A pressure regulator and further conduits (not shown) can in accordance with conventional practice be attached to the valve 10 using female threads 38. With valve 10 installed in the high pressure fluid line, fluid under normal conditions would flow entirely through the gap between large diameter portion 22 of passage 18 and the ball 24'. If there is a sudden loss of fluid containment downstream of valve 10, for example due to a hose breakage, the pressure downstream of valve 10 will suddenly drop to near atmospheric. This leads to a sudden increase in the pressure drop across the valve 10 leading to a sudden increase in fluid flow through the gap between ball 24' and large diameter passage portion 22.

The increase in flow around ball 24' increases the fluid dynamic drag force on ball 24'. With the uncontrolled fluid flow associated with a loss of containment, the drag force on the ball is sufficient to compress spring 28' until the ball 24' seats in valve seat 20 thereby shutting off further flow of fluid. This activated position of valve 10 is shown in FIG. 6. Once fluid containment is restored, for example by repairing the ruptured hose, ball 24' will return to its normal position allowing normal operation of the high pressure fluid system to resume.

The embodiment of FIGS. 5 and 6 has the further advantage that it is also a one-way valve. Thus, if the embodiment of FIGS. 5 and 6 is assembled with the wrong end upstream, the mistake is immediately apparent since no flow can occur through the valve. Further, no harm will result from such a mistake.

EMBODIMENTS 5 AND 6

Figure 7:
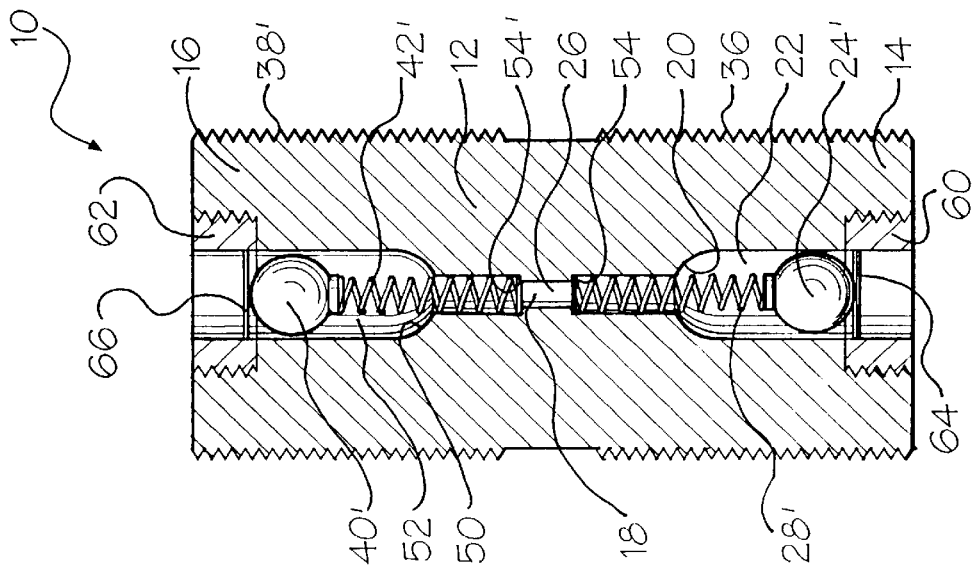
FIG. 7 is a cross sectional view of a fifth embodiment of the safety shut-off valve of the present invention with the ball in the normal position.
Figure 8:
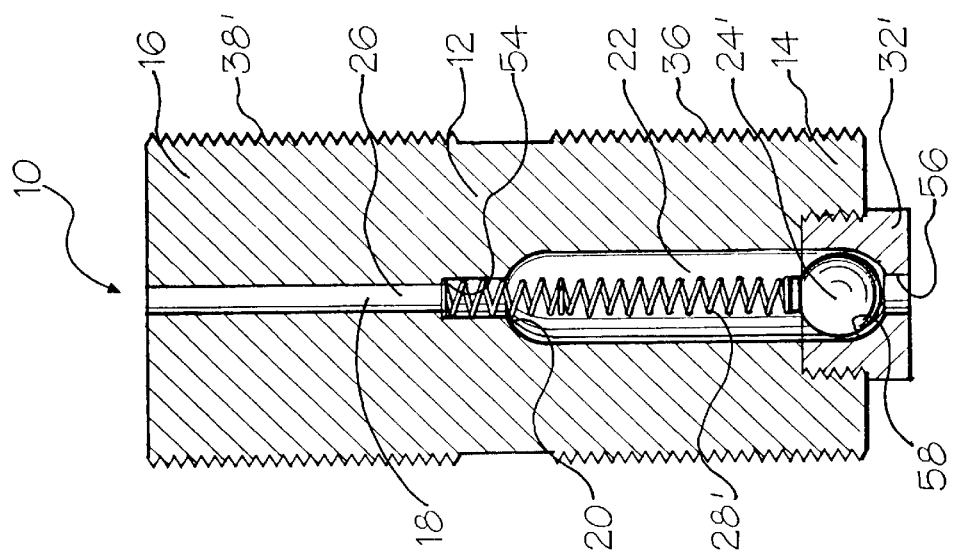
FIG. 8 is a cross sectional view of a sixth embodiment of the safety shut-off valve of the present invention with the ball in the normal position.

Referring to FIGS. 7 and 8 variations of the embodiment of FIGS. 5 and 6 are seen. The embodiment shown in FIG. 7 is identical to the embodiment shown in FIGS. 5 and 6 except that female threads 38 are replaced by male threads 38'. This variation allows the valve 10 to be used in applications where both the outlet of the high pressure bottle and the downstream valve or conduit have female threads.

Referring to FIG. 8 a variation of the embodiment of FIG. 7 is seen. In this embodiment a second ball 40', second spring 42', second retaining shoulder 54', and second valve seat 50 are provided at the second end 16 of the valve body 12. The second ball 40', second spring 42', second retaining shoulder 54', and second valve seat 50 are arranged to be a mirror image of the arrangement at the first end 14 of valve body 12. A second large diameter portion 52 is also provided to house the second ball 40', second spring 42'. The second large diameter portion 52 has the same diameter as the large diameter portion 22 and is a mirror image thereof. Inserts 60 and 62 having retaining pins 64 and 66 are used in place of insert 32'. The retaining pins 64 and 66 function to retain balls 24' and 40' within respective cavities 22 and 52.

Having identical ends for the valve 10 allows either one of ends 14 and 16 to act as the fluid inlet to the valve. This arrangement eliminates the possibility of installing the valve 10 with the wrong end upstream. The ball and spring in the end acting as the inlet behave in exactly the same way as was described in reference to the embodiment of FIGS. 5 and 6, except here pins 64 and 66 take over the function of reduced diameter portion 56 of insert 32'. The ball and spring in the end acting as the outlet have no effect on flow control. Except as noted above the embodiments of FIGS. 7 and 8 are identical.

EMBODIMENTS 7 AND 8

Figure 9:
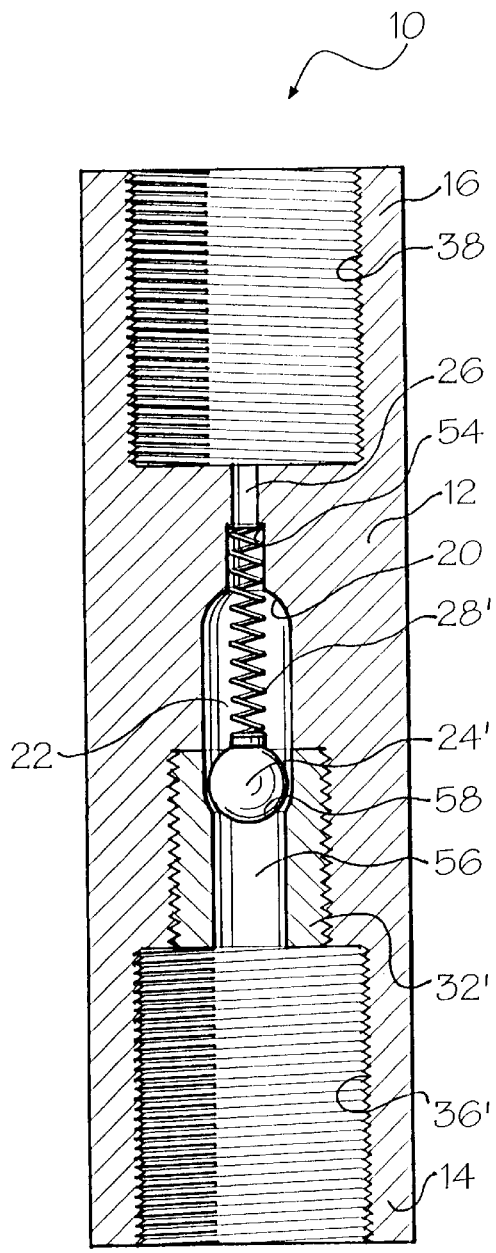
FIG. 9 is a cross sectional view of a seventh embodiment of the safety shut-off valve of the present invention with the ball in the normal position.

Referring to FIG. 9 another variation of the embodiment of FIGS. 5 and 6 is seen. The embodiment shown in FIG. 9 is identical to the embodiment shown in FIGS. 5 and 6 except that male threads 36 are replaced by female threads 36'. This variation allows the valve 10 to be used in applications where both the outlet of the high pressure bottle and the downstream valve or conduit have male threads.

Figure 10:
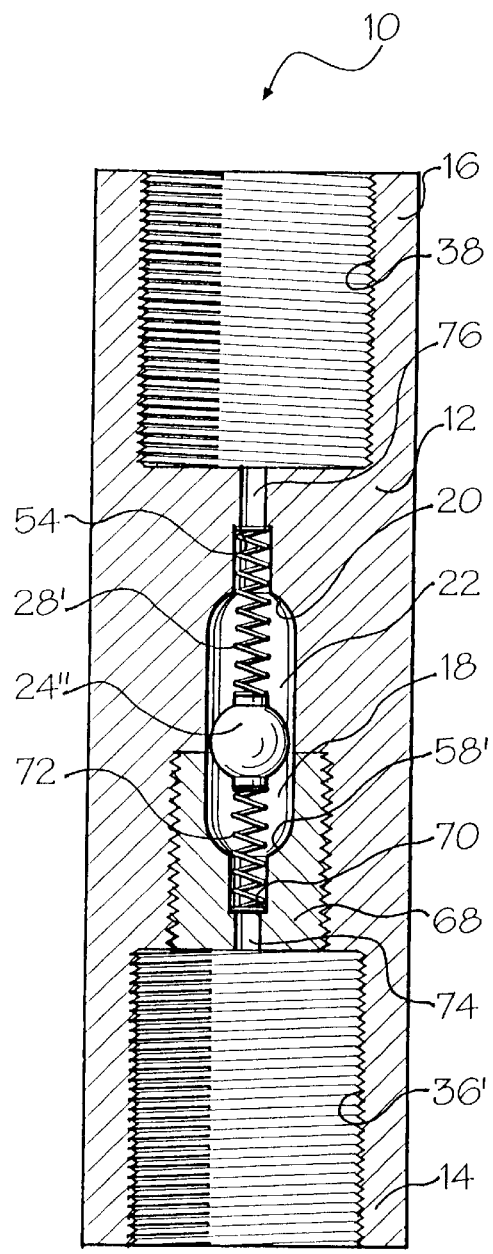
FIG. 10 is a cross sectional view of a first embodiment of the safety shut-off valve of the present invention with the ball in the normal position.

Referring to FIG. 10, the safety shut-off valve 10 includes an elongated valve body 12 having first and second ends 14 and 16 respectively. The valve body has a passage 18 extending therethrough. A valve seat 20 is provided in passage 18 at a first end of a large diameter portion 22 of the passage 18. Threaded insert 68 having a second valve seat 58' and a second retaining shoulder 70, retains springs 72 and 28' and ball 24" within portion 22 of the passage 18, and defines the second end of the cavity 22.

The large diameter portion 22 is located medially within valve body 12. Small diameter passages 74 and 76 provide for fluid communication between the large diameter portion 22 and the ends 14 and 16 respectively. Spring 72 extends between ball 24" and shoulder 70. Similarly, spring 28' extends between ball 24" and shoulder 54. Ball 24" functions in the same manner as described for ball 24' in the embodiment of FIGS. 5 and 6, except that in FIG. 10 the additional spring results in the ball 24" having a more central normal position within large diameter portion 22.

Again the symmetry of the embodiment of FIG. 10 allows either end to be used as the inlet eliminating the possibility of having the wrong end upstream.

Many types of materials can be used to build the safety shut-off valve of the present invention to suit different uses. Some examples of these materials are steel, plastic, nylon, teflon, stainless steel, brass, and aluminum. These materials can be used in any combination, depending on the use of the safety valve. The valve body can be constructed by machining or molding.

The safety shut-off valve of the present invention can be used with any gas, liquid, or steam. Examples of applications include use on boilers, gas lines, gas bottles, gas wells, gas tanks, oil wells, oil lines, water lines, hydraulic lines, and/or any application dealing with pressurized flow.

Although in the illustrated examples the male and female threaded portions have been shown as having a uniform root diameter, the threaded portions can also be made in a tapered fashion as is conventional in certain high pressure fittings.

It is to be understood that the present invention is not limited to the embodiments described above, but encompasses any and all embodiments within the scope of the following claims.

We claim:

1. A safety shut-off valve comprising:

an elongated valve body having first and second ends, said valve body having a passage having first and second portions therein, the diameter of said second portion of said passage being greater than the diameter of said first portion of said passage, said passage extending between said first end and said second end, and said second portion of said passage extending between said first end and a first valve seat;

a ball provided with said second portion of said passage, said ball being movable into sealing engagement with said first valve seat;

means defining a fluid flow through said valve passage, said fluid flow substantially ceasing when said ball is in sealing engagement with said first valve seat;

retaining means comprising a gin disposed transverse to said passage proximate said first end;

a tension spring biasing said ball out of engagement with said first valve seat, said tension spring having a first spring end and a second spring end, said tension spring engaging with said retaining means at its first spring end, and said ball at its second spring end, said tension spring being in tension when said ball is in engagement with said first valve seat, whereby excessive fluid flow caused by a loss of fluid containment downstream of said valve passage causes said ball to move against its tension biasing into sealing engagement with said first valve seat;

a second valve seat provided in said passage proximate said second end said passage having a third portion extending between said second valve seat and said second end the diameter of said third portion of said passage being substantially equal to the diameter of said second portion of said passage;

a second ball disposed within said third portion of said passage;

a second retaining pin disposed transverse to said passage proximate said second end; and a second spring engaging said second retaining pin at a first end thereof and said second ball at a second end thereof, whereby said second spring is in tension when said second ball is in engagement with said second valve seat.

2. The safety shut-off valve in accordance with claim 1, wherein said valve body comprises four portholes proximate said first end for normal fluid flow when said ball is not in engagement with said valve seat and said first end acts as a fluid inlet, and said valve body comprising four portholes proximate said second end for normal fluid flow when said second ball is not in engagement with said second valve seat and said second end acts as a fluid inlet.

* * * * *